(12) United States Patent
Wu et al.

(10) Patent No.: US 7,343,280 B2
(45) Date of Patent: Mar. 11, 2008

(54) PROCESSING NOISY DATA AND DETERMINING WORD SIMILARITY

(75) Inventors: Hua Wu, Beijing (CN); Ming Zhou, Beijing (CN); Chang-Ning Huang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 954 days.

(21) Appl. No.: 10/611,368

(22) Filed: Jul. 1, 2003

(65) Prior Publication Data
US 2005/0004790 A1 Jan. 6, 2005

(51) Int. Cl.
*G06F 17/21* (2006.01)
*G06F 17/27* (2006.01)

(52) U.S. Cl. .......................................... 704/10; 704/9
(58) Field of Classification Search ................ 704/10
See application file for complete search history.

(56) References Cited

U.S. PATENT DOCUMENTS 6,076,051 A * 6/2000 Messerly et al. ............. 704/9
6,098,033 A * 8/2000 Richardson et al. ........... 704/1
6,871,174 B1 * 3/2005 Dolan et al. .................. 704/9
6,901,402 B1 * 5/2005 Corston-Oliver et al. ... 707/101

OTHER PUBLICATIONS

Gasperin et al ("Using Syntactic Contexts for Measuring Word Similarity", Workshop on Knowledge Acquistion and Categorization, ESSLLI, 2001).*
Evert et al ("Methods for the Qualitative Evaluation of Lexical Association Measures", Proceedings of the 39th Annual Meeting of Association for Computational Linguistics, 2001).*

* cited by examiner

*Primary Examiner*—David Hudspeth
*Assistant Examiner*—Samuel G Neway
(74) *Attorney, Agent, or Firm*—Joseph R. Kelly; Westman, Champlin & Kelly, P.A.

(57) ABSTRACT

The present invention deals with noisy data not by eliminating low frequency dependency structures, but rather by weighting the dependency structures. The dependency structures are weighted to give less weight to dependency structures which are more likely incorrect and to give more weight to dependency structures which are more likely correct.

16 Claims, 8 Drawing Sheets

| RELATED WORD | DEPENDENCY RELATION TYPE | FREQUENCY COUNT INDICATOR | 214 |

FIG. 3

PROCESSING NOISY DATA AND DETERMINING WORD SIMILARITY

BACKGROUND OF THE INVENTION

The present invention relates to using data in determining a similarity between two words. More specifically, the present invention relates to processing noisy data in determining the similarity.

In natural language processing, there are many applications which determine word similarity. That is, many applications require that the similarity between different words be determined, for a variety of different reasons.

A fairly straightforward example of a natural language processing system that determines word similarity is a thesaurus builder. In order to build a thesaurus, the natural language processing system receives an input word and finds a plurality of similar words, which have generally the same meaning as the input word. This is repeated for a variety of different input words and the thesaurus is built using the identified similar words.

Another example, of an application that determines word similarity is machine translation. Machine translation is the process of receiving a textual output in a first language and translating it to a textual output in a second language. Machine translators sometimes use a thesaurus or other data store to find similarity between two different words.

Another example where word similarity is used is information retrieval. In information retrieval systems, a first textual input (sometimes referred to as a query) is received by an information retrieval system. The information retrieval system then executes the query against a database to return documents which are relevant to the query. In executing the query against the database, it is not uncommon for the query to be expanded. In order to expand the query, the information retrieval system identifies the content words in the query and attempts to find words having a similar meaning to the content words. The similar words are then added to the query to create an expanded query, and that expanded query is then executed against the database.

In calculating similarity between words, many natural language processing systems use structured or annotated data. For example, in automated word classification systems, certain linguistic dependency structures are used to represent the contexts of the words to be classified. The structured linguistic data is used because it reveals the deeper syntactic and semantic relationships between words in a sentence.

One specific embodiment of structured data is a dependency triple. Examples of dependency triples are <verb,OBJ,noun> and <noun,ATTRIB,adjective>, etc. Such dependency triples indicate the syntactic and semantic relationships between words in a given sentence.

The triples (or other dependency structures) are generated using existing text parsers. One known way for generating such dependency structures is set out in U.S. Pat. No. 5,966,686, issued Oct. 12, 1999, entitled METHOD AND SYSTEM FOR COMPUTING SEMANTIC LOGICAL FORMS FROM SYNTAX TREES. Of course, a wide variety of other techniques are also known for generating different types of dependency structures.

One drawback with such systems is that conventional parsers tend to generate dependency structures (such as the dependency triples mentioned above) that are incorrect. The parsed data which includes erroneous dependency structures is referred to as "noisy" data.

There have been a variety of different techniques attempted in the past in order to deal with noisy data. One traditional method for handling noisy data is to count the number of occurrences of the dependency structure in the training data. Dependency structures which have a number of occurrences which fall below a certain threshold level are simply assumed to be erroneous and are eliminated. The basic assumption behind this method is that low frequency dependency structures will more likely occur by chance, and are thus more likely to be wrong.

However, this method of handling noisy data does have disadvantages. For example, the parsed data will very likely have a large number of correct dependency structures which occur very infrequently. If all low frequency dependency structures are eliminated regardless of whether they are correct, a large amount of data will be lost. Thus, the technique may increase the precision rate of correct dependency structures in the parsed data set, but the recall of correct dependency structures will definitely decrease.

Another disadvantage of the prior technique of handling noisy data involves data sparseness. The parsed data is often sparse to begin with. Eliminating a large number of dependency structures simply because they occur relatively infrequently exacerbates the data sparseness problem.

Yet another disadvantage of eliminating low frequency dependency structures is that many of them are correctly parsed dependency structures. Therefore, not only does filtering out the low frequency dependency structures eliminate a large amount of data, it in fact eliminates a large amount of correct data.

SUMMARY OF THE INVENTION

The present invention deals with noisy data not by eliminating low frequency dependency structures, but rather by weighting the dependency structures. The dependency structures are weighted to give less weight to dependency structures which are more likely incorrect and to give more weight to dependency structures which are more likely correct.

In one embodiment, the dependency structures are weighted based on a frequency measure which is indicative of how frequently the dependency structures occurred in the training data.

In yet another embodiment, different measures are used to calculate the weight for the dependency structures, depending on how frequently the dependency structure occurred in the training data. For example, it has been found that one weighting measure more accurately weights the dependency structures that occur with high frequency and a second weighting measure more accurately weights the dependency structures that occur with a low frequency. Therefore, in accordance with one embodiment of the invention, a different weighting measure is applied to weight the dependency structures based on how frequently the dependency structures occurred in the training data.

In accordance with another embodiment of the invention, a method is used for determining the best lexical association measure (or weighting measure) for use in weighting the dependency structures. Precision-recall curves are generated for each possible lexical association measure and cost and gain associated with the association measures is determined. The cost and gain are used to identify the best lexical association measure for use in weighting the dependency structures in the similarity calculation.

BRIEF DESCRIPTION OF THE DRAWINGS

FIG. 3 illustrates one illustrative vector formed for words in the training data.

DETAILED DESCRIPTION OF ILLUSTRATIVE EMBODIMENTS

The present invention deals with processing of noisy data in a natural language processing system. More specifically, the present invention relates to weighting dependency structures generated by parsing training data in order to determine word similarity. However, prior to discussing the present invention in more detail, one illustrative embodiment of an environment in which the present invention can be used is discussed.

Figure 1:
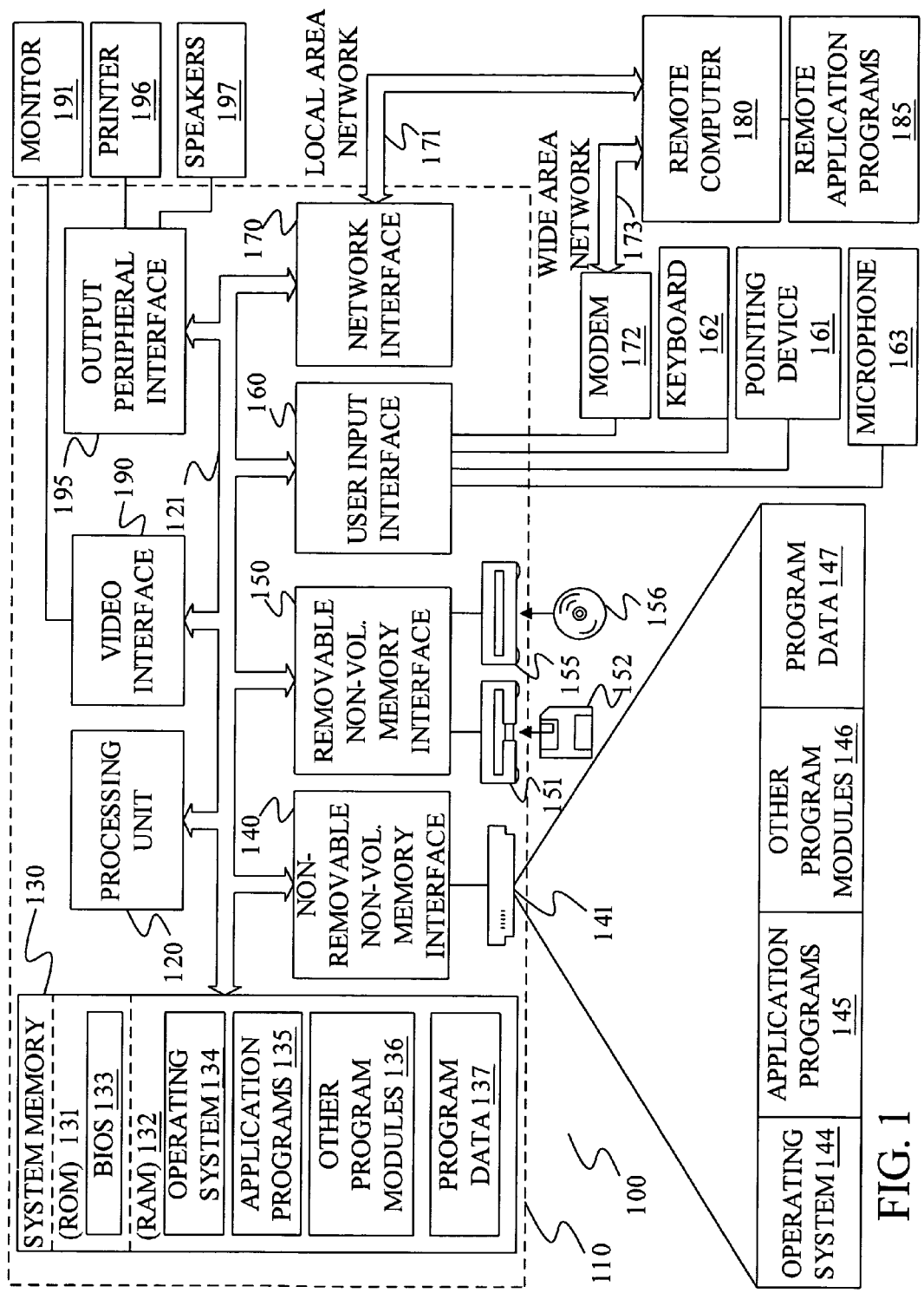
FIG. 1 is a block diagram of one illustrative embodiment of a system in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2A:
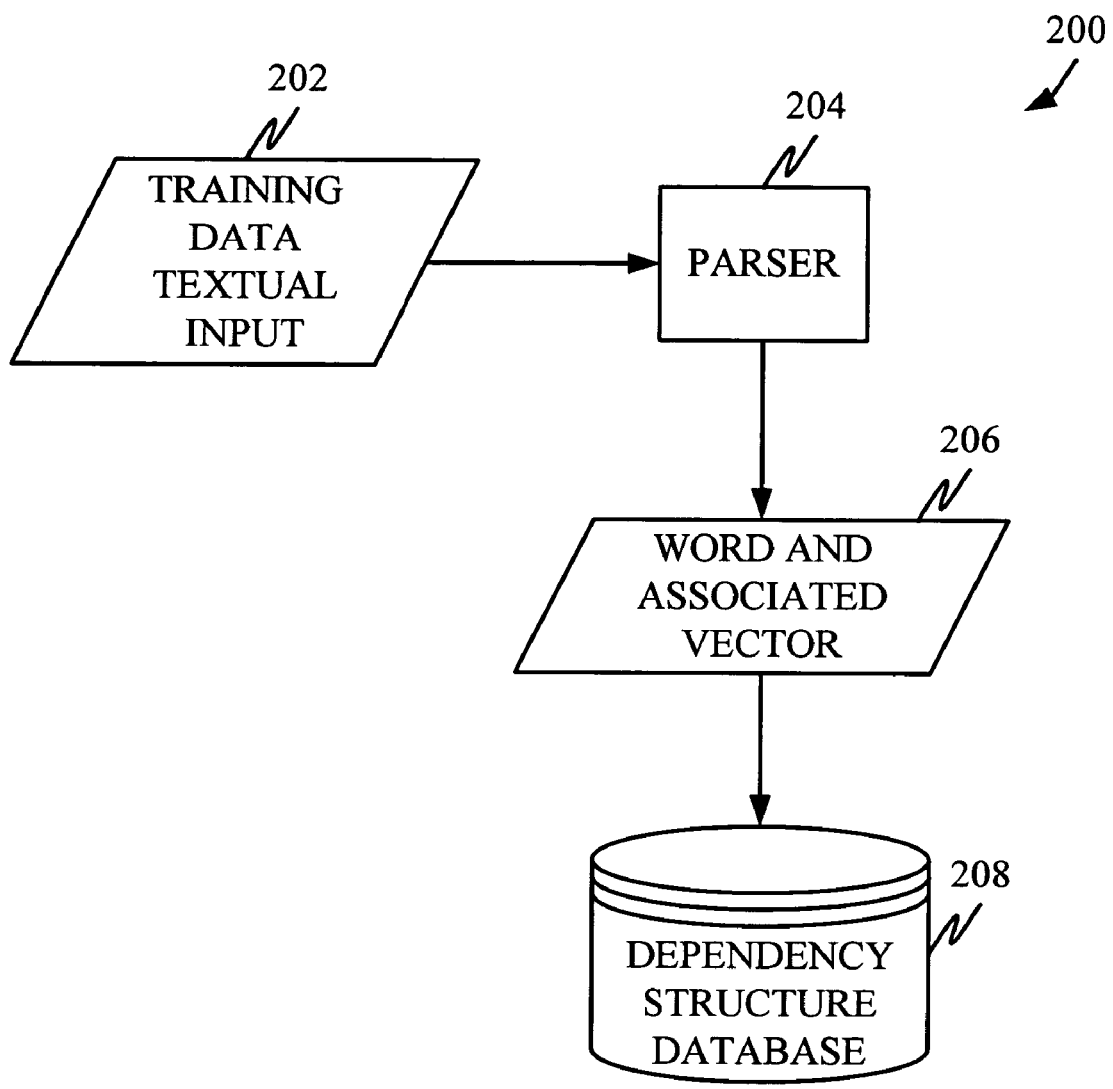
FIG. 2A is a block diagram of a dependency structure generating system in accordance with one embodiment of the present invention.

FIG. 2 is a block diagram of a dependency structure generation system 200 in accordance with one embodiment of the present invention. System 200 includes a parser 204 which receives training data in the form of a textual input 202. Parser 204 parses the training data and outputs individual words in the training data along with an associated vector 206. The words and associated vectors are stored in dependency structure database 208. It should be noted that the present invention will be described with respect to dependency triples. However, a wide variety of other dependency structures can be used as well and dependency triples are discussed for the sake of example only.

In one embodiment, the training data textual input 202 is simply a large corpus of pre-existing text. The corpus is parsed by parser 204. In one illustrative embodiment, the parser is that discussed in Jensen et al., *NATURAL LANGUAGE PROCESSING: The PLNLP Approach*, Kluwer Academic Publishers (1993). The parser generates dependency triples such as the logical forms discussed in U.S. Pat. No. 5,966,686. Therefore, the parsing results are represented by individual dependency triples, which describe the syntactic-semantic relationship between words in a sentence in textual input 202.

For example, the sentence "This red coat is owned by her." Produces the following three triples after parsing:
<own, SUBJ, she>;
<own,OBJ,coat>; and
<coat,ATTRIB,red>

These triples can generally be represented by the structure <head,relation-type,dependent>.

Figure 2B:
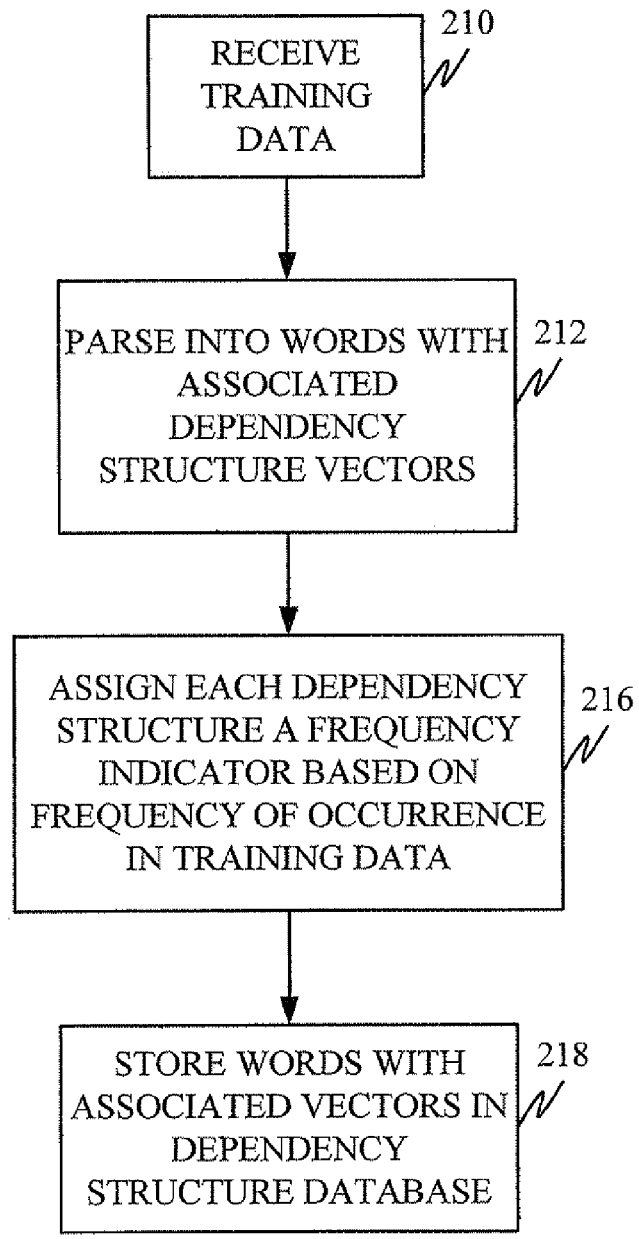
FIG. 2B is a flow diagram illustrating the operation of the system shown in FIG. 2A.

Once, parser 204 receives the textual input 202, as indicated by block 210 in FIG. 2B and parses the textual input into words with a corresponding dependency structures, it illustratively forms attribute vectors associated with the words. This is indicated by block 212 in FIG. 2B.

One example of a dependency structure attribute vector is illustrated at 214 in FIG. 3. Each word (or each content word) in input 202 illustratively has such a vector generated for it. It can be seen in FIG. 3 that vector 214 has at least three portions. The first portion identifies the word in the dependency structure which is related with the content word for which the vector was generated. The second portion includes the dependency relation or relation type that identifies the type of relation that exists between the content word and the related word. The third portion includes a frequency count indicator which indicates how frequently the dependency structure, with the content word, occurred in the training data.

By way of example, using the three triples set out above, for the word "own" one vector 214 would include the word "she" in the related word portion of the vector, the dependency relation type "SUBJ" in the dependency relation type portion of vector 214 and a frequency count indicator. The frequency count indicator is an indication of the frequency with which the dependency structure that gave rise to vector 214 occurred in the training data. Thus, the frequency count indicator will be indicative of the count of that dependency structure. Of course, the count will likely be further processed, such as normalized, etc., and the frequency count indicator will illustratively be the processed value, rather than the raw count value. Assigning each vector a frequency indicator based on a frequency of occurrence of that dependency structure in the training data is indicated by block 216 in FIG. 2B.

Parser 204 then stores the words with their associated attribute vectors in the dependency structure database 208. This is indicated by block 218 in FIG. 2B.

Figure 4A:
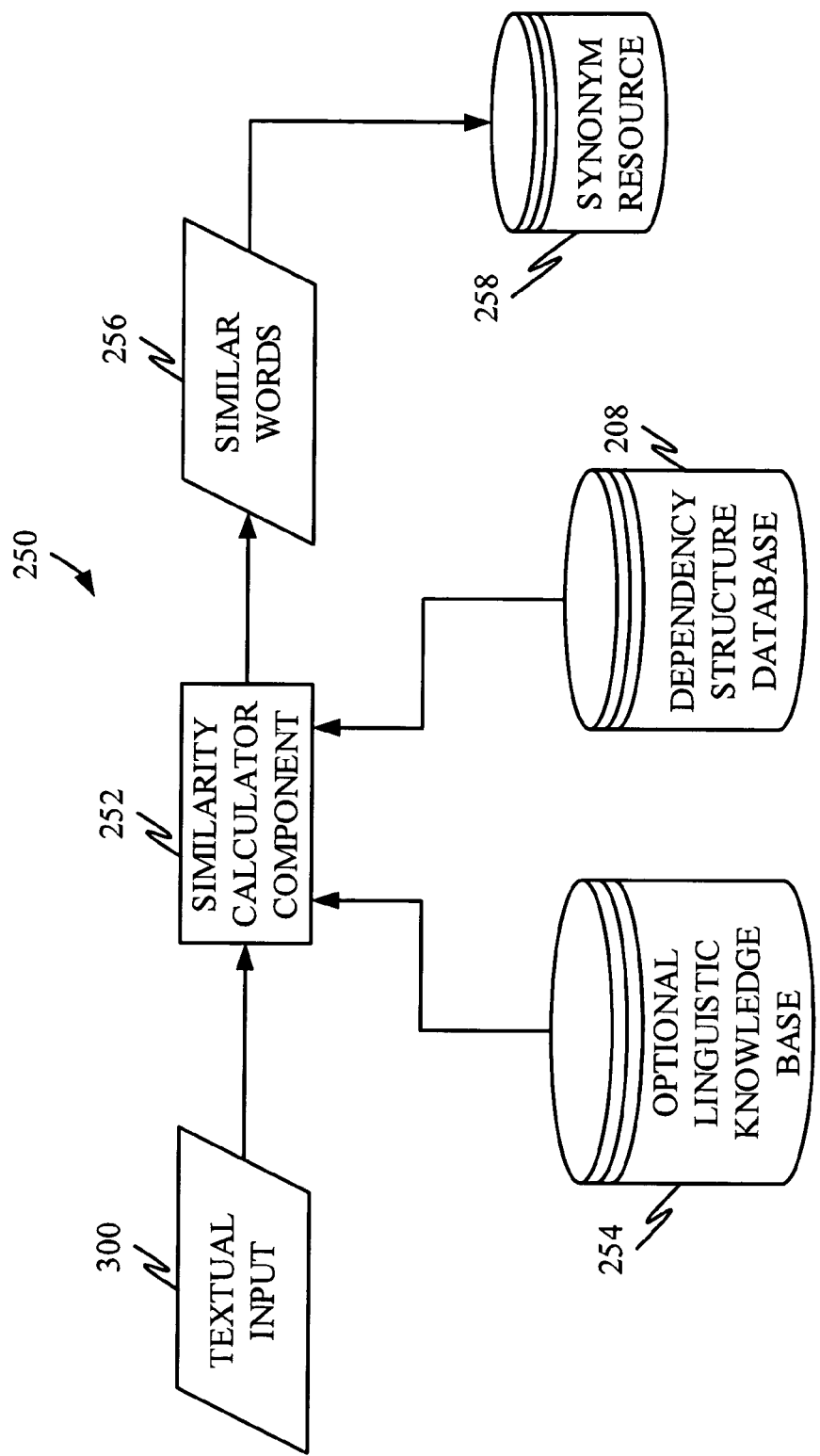
FIG. 4A is a block diagram of one illustrative embodiment of a word similarity system in accordance with one embodiment of the present invention.
Figure 4B:
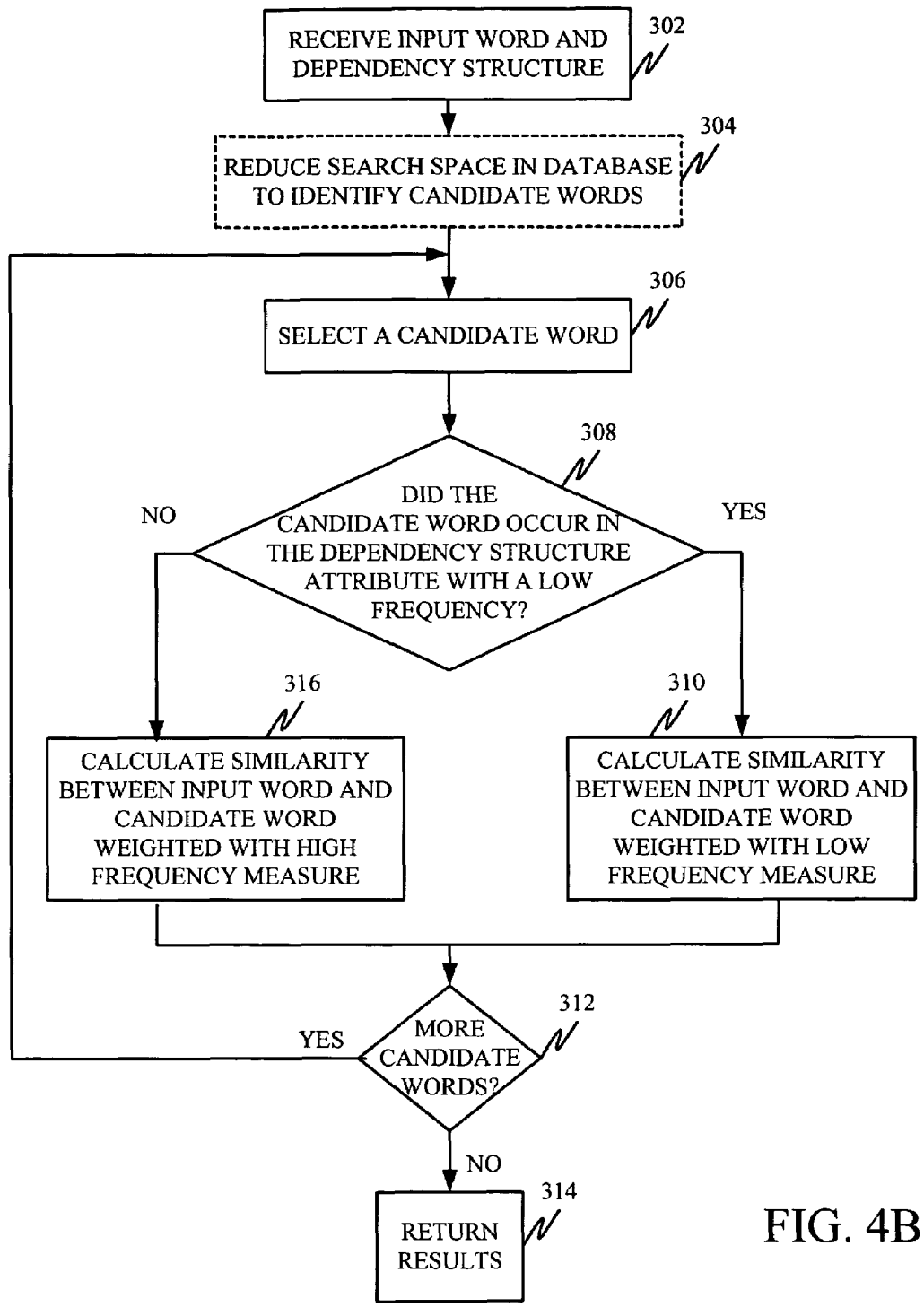
FIG. 4B is a flow diagram illustrating the operation of the system shown in FIG. 4A in accordance with one embodiment of the present invention.

FIG. 4A shows a block diagram of a system 250 for extracting similar words using the data in database 208. FIG. 4B is a flow diagram illustrating the operation of system 250 in accordance with one embodiment of the present invention. System 250 includes a similarity calculator 252 that has access to dependency structure database 208 and an optional linguistic knowledge base 254. Similarity calculator 252 can output similar words 256 either directly to an application or to a synonym resource 258 that stores synonym records.

Prior to discussing the operation of system 250 in more detail, a discussion of association measures is warranted. Many statistical methods are used for identifying lexical associations between words. Some such statistical methods include mutual information (MI), log-likelihood ratio tests, X-test t-test and co-occurrence frequency. Each of these techniques is discussed in greater detail in Manning and Schutze, *FOUNDATIONS OF STATISTICAL NATURAL LANGUAGE PROCESSING*, Chapter 5, The MIT Press, London, England (1999). Lexical association measures where also compared in Evert and Krenn, *METHODS FOR QUALITITIVE EVALUATION OF LEXICAL ASSOCIATION MEASURES*, Proceedings of the 39$^{th}$ Annual Meeting of Association for Computational Linguistics (2001). The log-likelihood ratio test is also set out in greater detail in Dunning, *ACCURATE METHODS FOR STATISTICS OF SURPRISE AND COINCIDENCE*, Computational Linguistics, 19(1):16-74 (1993).

Figure 5:
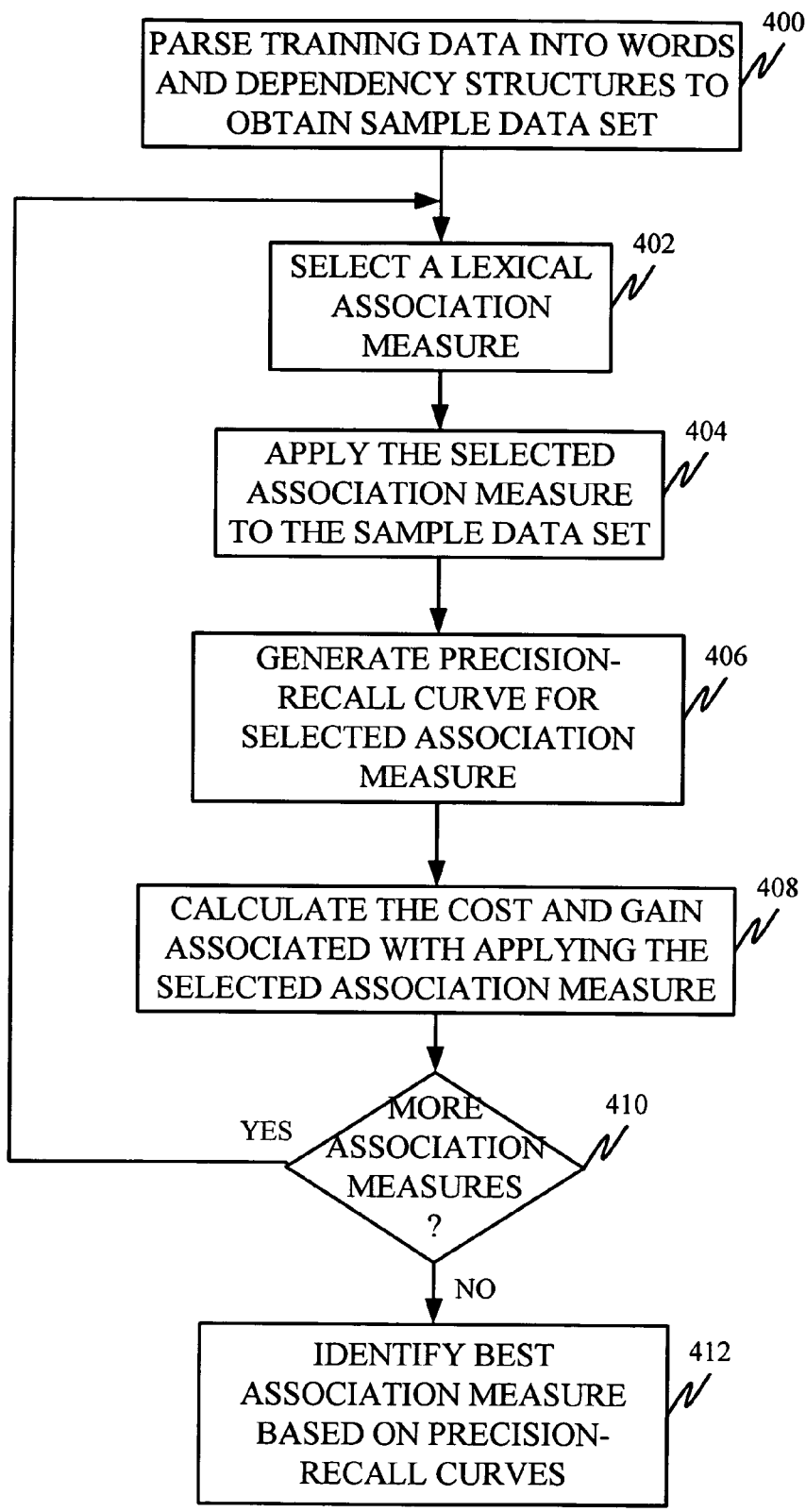
FIG. 5 is a flow diagram illustrating how a lexical association measure is chosen to weight dependency structures generated from the training data.
Figure 6:
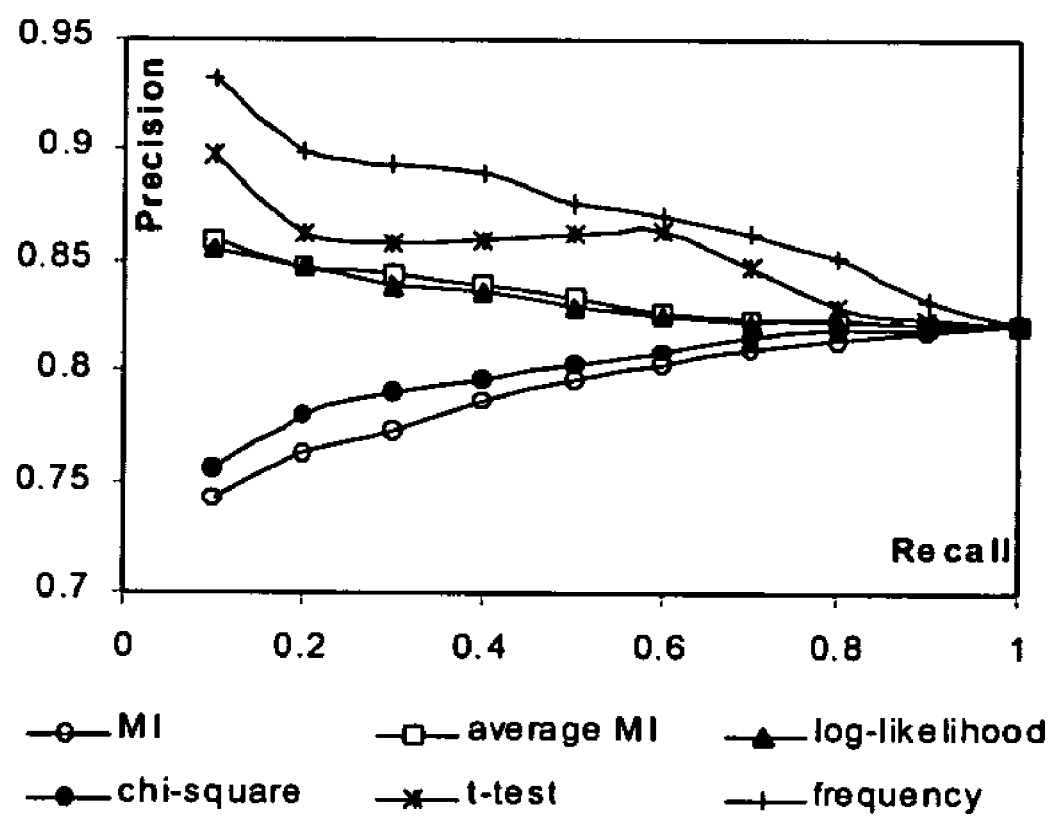
FIG. 6 is one exemplary set of precision-recall curves for a plurality of different lexical association measures.

As discussed in greater detail with respect to FIGS. 5 and 6, each of these lexical association measures was considered to determine which measure most accurately identifies correct dependency structures for dependency structures which occur with different frequency in the training data. It was found that the co-occurrence frequency measure consistently identified correct and incorrect dependency structures with desirable accuracy. The co-occurrence frequency measure assigned higher scores to correct dependency structures and lower scores to incorrect dependency structures, particularly with respect to dependency structures which occurred with a relatively low frequency.

There is also a great deal of literature which describes different techniques for calculating the similarity between words using a variety of different similarity measures. These similarity measures rely on the assumption that similar words tend to have similar contexts. When using a parsed corpus, the contexts are expressed using all, or a portion of, the dependency structure. The dependency structure or portion thereof used to determine the context of a word is referred to herein as an attribute.

By way of example, in the sentence "I declined the invitation.", the verb "declined" as two attributes:

<OBJJ,invitation>; and
<SUBJ,I>

Therefore, two verbs will generally be considered similar to "decline" if they have similar attributes.

Different techniques for addressing the problem of similar word extraction based on dependency structures are set out in Hindle, *NOUN CLASSIFICATION FROM PREDICATE-ARGUMENT STRUCTURE*, Proceedings of the Annual Meeting for Association of Computational Linguistic, Pittsburgh, Pa. (1990); Grefenstette, *EXPLORATIONS IN ATOMIC THESAURUS DISCOVERY*, Kluwer Academic Press (1994); Gasperien et al., *USING SYNTACTIC CONTEXTS FOR MEASURING WORD SIMILARITY*, Workshop on Knowledge Acquisition and Categorization, ESSLLI (2001); and Lin, *EXTRACTING CO-LOCATIONS FROM TEXT CORPOA*, First Workshop on Computational Terminology, Montreal, Canada, (1998).

One exemplary similarity measure is referred to as the "Dice measure". In accordance with one embodiment of the present invention, the Dice measure is weighted using the co-occurrence frequency lexical association measure. This has the effect of weighting low frequency dependency structures relatively lower than higher frequency dependency structures in the word similarity calculation. One example of a weighted Dice measure in accordance with one aspect of the present invention is set out in Eq. 1 as follows:

$$Sim(w_1, w_2) = \frac{|W(w_1, att_i) \cap W(w_2, att_j)|}{|W(w_1, att_i) \cup W(w_2, att_j)|} \qquad \text{Eq. 2}$$

$$= \frac{\sum_{att_k \in A(w_1) \cap A(w_2)} (W(w_1, att_k) + W(w_2, att_k))}{\sum_{att_i \in A(w_1)} W(w_1, att_i) + \sum_{att_j \in A(w_2)} W(w_2, att_j)}$$

Where $A(w_i)$ denotes the attribute set of a current word $w_i$;

$att_i$ represents an attribute of the word $w_i$;

$W(w, att_i)$ is the frequency weight applied by the co-occurrence lexical association measure, expressed as $\log(\text{fre}(w_i, att_i)+1)$ and where $\text{fre}(w_i, att_i)$ is the normalized frequency of occurrence of the word $w_i$ with $att_i$; and $W(w_2, att_j)$ is also represented by the $\log(\text{fre}(w_2, att_j)+1)$ where $\text{fre}(w_2, att_j)$ is the normalized frequency of occurrence of word $w_2$ with attribute $att_j$.

Using this weighted similarity measure, similarity calculator component 252 can calculate a similarity between two different words, or it can identify and extract similar words (similar to that received as an input) in dependency structure database 208.

One embodiment for performing a similarity calculation is now described with respect to FIGS. 4A and 4B. First, similarity calculator component 252 receives textual input 300 that contains a word for which similar words are to be located. In one embodiment, a sentence is received and the context (or dependency structures associated with the input word) are generated by a parser. In another embodiment, the dependency structure is simply received along with the word for which similar words are to be located. In any case, receiving the input word and an associated dependency structure is indicated by block 302 in FIG. 4B.

When calculating the similarity of words in dependency structure database 208 to the input word in textual input 300, similarity calculator component 252 compares each word in dependency structure database 208 with the input word and obtain a similarity score for each comparison. However, in accordance with one embodiment of the present invention, similarity calculator component 252 first reduces the search space in dependency structure database 208 in order to reduce the time required to locate similar words. Reducing the search space in dependency structure database 208 is indicated by optional block 304 in FIG. 4B.

In one embodiment, the search space is reduced by receiving the input word in input 300 and accessing optional linguistic knowledge base 254. In an illustrative embodiment, knowledge base 254 is a translation database which includes translations of words from a first language into a second language. Given the input word, similarity calculator component 252 obtains a possible translation set from knowledge base 254. For each word in dependency structure database 208 that has a possible translation that is found in the translation set for the input word, those words are identified on a candidate word list as candidate similar words to the input word. A similarity calculation is performed for each candidate word. Accessing optional linguistic knowledge base 254 speeds up the process because component 252 only needs to calculate the similarity between the input word and the selected candidates, rather than between the input word and all words in dependency structure database 208.

Thus, similarity calculator component 252 first selects a candidate word from the candidate word list. This is indicated by block 306 in FIG. 4B. Next, similarity calculating component 252 applies the similarity measure to the candidate word and the input word to determine their similarity. In accordance with one embodiment, the co-occurrence frequency measure is used to weight the similarity calculation measure for all words. One embodiment of this is shown in Eq. 1 above.

However, in accordance with a second embodiment of the present invention, different weighting measures are used depending on the frequency of occurrence of the dependency structures. For example, it has been found that the co-occurrence frequency measure is desirable for weighting the similarity calculation when determining similarity between words that are contained in dependency structure attributes that occur with relatively low frequency. It has also been found that the MI measure is useful in weighting the similarity calculation when calculating the similarity between words that are contained in dependency structure attributes that occur with relatively high frequency.

Therefore, in accordance with one embodiment of the present invention, after similarity calculator component 252 has identified candidate similar words and has selected one candidate similar word for a similarity calculation, similarity calculator component 252 then determines whether the candidate word that has been selected has an attribute which occurs with a relatively low frequency. In order to do this, similarity calculator component 252 simply needs to access the frequency count indicator portion of vector 214 associated with the candidate word. If the frequency count indicator falls above a desired threshold, then the attribute associated with the candidate word is a relatively high frequency attribute. If it falls below a predetermined threshold, then it is a relatively low frequency attribute. Determining whether the attribute is relatively high or low frequency is indicated by block 308 in FIG. 4B.

If, at block 308, component 252 determines that the attribute associated with the candidate word is a relatively low frequency attribute, then it calculates the similarity measure between the input word and the candidate word, using Equation 1, weighted with the low frequency measure. This is indicated by block 310 in FIG. 4B.

Component 252 then determines whether more candidates must be analyzed. This is indicated by block 312. If so, the next candidate word is selected at block 306 and processing continues from that point. If not, component 252 outputs the similar word results 256 or stores them in a synonym resource database 258, or does any other operation with the results, as desired. This is indicated by block 314.

If, at block 308, it is determined that the attribute associated with the candidate word is not a relatively low frequency attribute, then component 252 performs the similarity calculation using a similarity measure weighted with a weight which corresponds to a high frequency measure. This is indicated by block 316 in FIG. 4B. For example, if the attribute is a relatively high frequency attribute, then the similarity calculation can be weighted by the MI measure as follows:

$$= \frac{\sum_{att_k \in A(w_1) \cap A(w_2)} MI(w_1, att_k) + MI(w_2, att_k))}{\sum_{att_j \in A(w_1)} MI(w_1, att_j) + \sum_{att_j \in A(w_2)} MI(w_2, att_j)} \quad \text{Eq. 2}$$

where $$W(w, att_i) = MI(w, att_i) = \log_2 \frac{p(w_2, att_i)}{p(w)p(att_i)} \quad \text{Eq. 3}$$

and where $p(w, att_i)$ is the probability of a word having attribute i; and $p(w)$ is the a priori probability of the word w; and $p(att_i)$ is the a priori probability of the attribute i.

Before combining the different weighting measures, the weighting should be normalized. If we use $W(w, att_i)$ to denote the weight of a word and its attribute, then the normalized weight should be $$W(w, att_i) = \frac{W(w, att_i)}{\max_i (W, att_i)}$$

Of course, it should be noted that a plurality of different weighting measures can be used as well. The present discussion shows two different weighting measures (co-occurrence frequency and MI) for purposes of example only, but three or more weighting measures could be used as well as a single weighting measure.

FIG. 5 is a flow diagram which illustrates how the co-occurrence frequency was chosen as the best weight for low frequency attributes. It will be appreciated that the method illustrated by FIG. 5 can be used on different corpora in order to determine which lexical association measure is most desirable for weighting the similarity calculation for that particular corpus. First, the training data is received and parsed into words and dependency structures to obtain a sample data set. This is indicated by block 400 in FIG. 5.

Then, of the lexical association measures to be tested, one is selected. This is indicated by block 402. The selected lexical association measure is then applied to the sample data set. This is indicated by block 404 in FIG. 5. In applying the selected association measure, each dependency structure is assigned a score and the dependency structures are ranked in decreasing order according to the scores. A precision-recall curve is then generated for the selected association measure. This is indicated by block 406. The best lexical association measure will illustratively assign higher scores to the correct dependency structures. The precision-recall curves are used as an evaluation method.

FIG. 6 illustrates one embodiment of a set of precision-recall curves corresponding to the lexical association measures mentioned above. At each fixed recall level, the corresponding precision is plotted. By adopting statistical measures to increase precision, there is also a risk that correct dependency structures will be eliminated. This decreases the recall accordingly. Therefore, when filtering the data according to the association measure, the cost and gain of applying the association measure can be calculated as follows:

Cost=1−Recall     Eq. 4

Gain=Precision−Baseline Precision

FIG. 6 illustrates that when there is no cost (recall=1), the precision is 0.821 for all measures tested. This is treated as a baseline precision value. Based on the cost and gain calculations, it can be seen that the frequency measure for the example data set tested is consistently the best for noisy data ranking. At each recall level, it provides the highest gain (or precision). This means that the co-occurrence frequency measure always assigns higher scores to correct dependency structures. Calculating the cost and gain associated with applying the selected association measure is indicated by block 408 in FIG. 5.

It is next determined whether any other association measures are to be evaluated. This is indicated by block 410. If so, processing returns to block 402 where the next lexical association measure is selected for testing.

If, at block 410, there are no more association measures to test, then the best association measure is identified based on the precision-recall curve. This is indicated by block 412 in FIG. 5. Using this methodology, the most desirable association measure can be chosen for weighting the similarity calculation in determining word similarity. In addition, of course, a plurality of desirable association measures can be chosen if the desired weighting varies based on the frequency of occurrence of the attributes.

It can thus be seen that the present invention determines a desirable association measure for weighting the word similarity calculation in a system for finding similarity between words. In one illustrative embodiment, the association measure is the co-occurrence frequency of attributes containing the words. In another embodiment, there are two association measures which are, for example, used to weight the similarity calculation, the co-occurrence frequency for low frequency attributes (such as those occurring once) and the MI measure for high frequency attributes (such as those occurring more than once).

In yet another embodiment, the present system generates a dependency structure database with vectors that include a frequency count indicator so that the word can be weighted during the similarity calculation.

Although the present invention has been described with reference to particular embodiments, workers skilled in the art will recognize that changes may be made in form and detail without departing from the spirit and scope of the invention.

What is claimed is:

1. A method of determining similarity between words, comprising:

receiving as an input a first word and a first dependency structure that includes the first word;

receiving a data structure indicative of a second word and a second dependency structure that includes the second word;

selecting one of a plurality of different weighting measures to weight a similarity measure based on whether a frequency indicator indicative of a frequency of occurrence of the second dependency structure in training data meets a frequency threshold value; and calculating the similarity between the first and second words based on the similarity measure weighted with the selected weighting measure.

2. The method of claim 1 wherein the plurality of weighting measures includes a co-occurrence weighting measure and a mutual information (MI) weighting measure.

3. The method of claim 2 wherein weighting the similarity measure comprises:

weighting the similarity measure with the co-occurrence frequency measure if the frequency indicator indicates the frequency of occurrence is below the frequency threshold value.

4. The method of claim 3 wherein weighting the similarity measure comprises:

weighting the similarity measure with the MI measure if the frequency indicator indicates the frequency of occurrence is above the frequency threshold value.

5. The method of claim 1 wherein receiving a data structure indicative of a second word comprises:

accessing a data store that stores records that include words and associated dependency structures and frequency indicators.

6. The method of claim 5 wherein the associated dependency structures and frequency indicators in the data store are stored as vectors associated with the words, and wherein accessing a data store comprises:

accessing the words and associated vectors.

7. The method of claim 5 wherein accessing the data store comprises:

identifying candidate words in the data store by reducing the search space of records in the data store.

8. The method of claim 7 wherein identifying candidate words comprises:

accessing a lexical knowledge base to identify possible candidate words in the data store.

9. A natural language processing system, comprising:

a data store storing head words and associated attributes, each of the attributes including a related word that was related to the head word in a training corpus, a relation type indicator indicating a type of relation between the head word and the related word, and a frequency indicator indicative of a frequency with which the attribute occurred relative to the head word in the training corpus; and a similarity generator configured to receive an input word and an associated input dependency structure and to access the data store and calculate a similarity between the input word and head words in the data store based on the input word and associated input dependency structure and the head words and associated dependency structures using a similarity measure that weights a similarity corresponding to a given head word with a first weighting measure if the frequency indicator associated with the given head word meets a predetermined frequency threshold value and with a second weighting measure different from the first weighting measure, if the frequency indicator does not meet the predetermined frequency threshold value.

10. The system of claim 9 wherein the similarity generator is configured to select a co-occurrence frequency weighting measure if the frequency indicator is below the predetermined threshold value.

11. The system of claim 10 wherein the similarity generator is configured to select a mutual information weighting measure if the frequency indicator is above the predetermined threshold value.

12. The system of claim 9 and further comprising:
a lexical knowledge base, the similarity generator being configured to access the lexical knowledge base to identify a subset of the head words in the data store as candidate words prior to calculating the similarity.

13. The system of claim 9 wherein the data store stores the attributes as vectors.

14. A system for in calculating similarity between words using annotated data, comprising:
a parser configured to receive a textual input and parse the textual input into dependency structures including words and relation types indicative of relations between the words in the textual input and generate a vector corresponding to each dependency structure, the vector including a related word, a relation type indicator, and a frequency indicator indicating a frequency with which the dependency structure occurred in the textual input;

a data store configured to store the words and corresponding vectors regardless of the frequency with which the dependency structures occurred in the textual input; and a similarity generator configured to receive an input word and an associated input dependency structure and to access the data store and calculate a similarity between the input word and words in the data store based on the input word and associated input dependency structure and the words and associated dependency structures in the data store using a similarity measure that weights a similarity corresponding to a given word in the data store with a first weighting measure if the frequency indicator associated with the given word meets a predetermined frequency threshold value and with a second weighting measure, different from the first weighting measure, if the frequency indicator does not meet the predetermined frequency threshold value.

15. The system of claim 14 wherein the frequency indicator comprises a normalized count value.

16. The system of claim 14 wherein the parser is configured to parse the textual input into dependency triples.

* * * * *